Patented Mar. 4, 1941

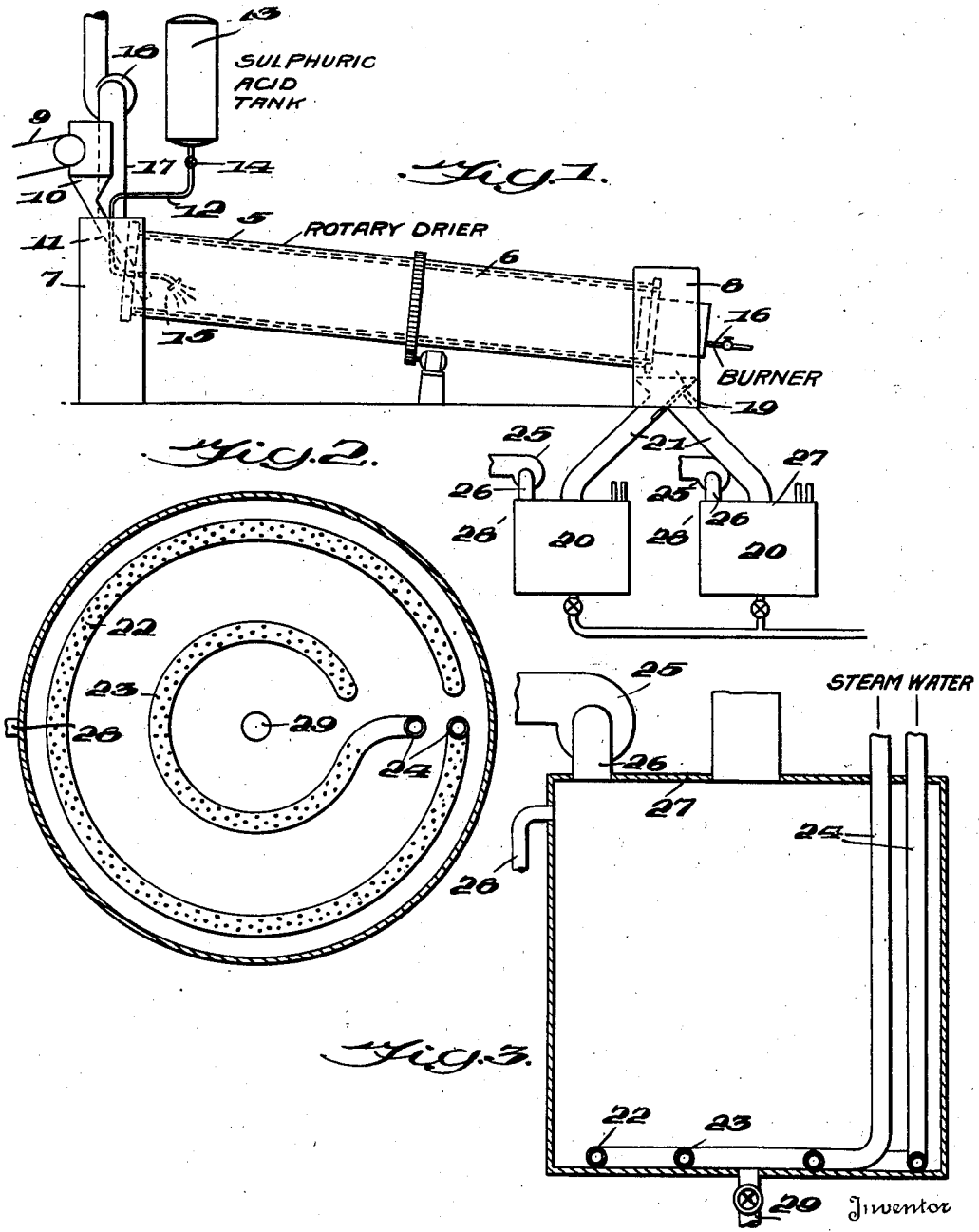

2,233,695

UNITED STATES PATENT OFFICE 2,233,695

METHOD OF ACID TREATING GRANULAR MATERIALS

Joshua A. Crew, Zanesville, Ohio, assignor to The Ayers Mineral Company, Zanesville, Ohio, a corporation of Ohio Application April 4, 1939, Serial No. 266,029

2 Claims. (Cl. 23—182)

This invention relates to an improved process for effecting the removal of ferrous impurities from sands, clays, ores and other granular or pulverulent materials. Such materials are often adapted for use in the manufacture of glassware, pottery or in other capacities wherein treatment of such materials is required to eliminate or greatly reduce naturally occurring impurities present therein. Such material, particularly sand, when adapted for use in the manufacture of glassware, should be substantially free from naturally occurring iron containing compounds which are often present in undesirable amounts.

It is an outstanding object of the present invention to provide a simple, economical and efficient process of acid treating silica sands by which ferrous impurities normally contained therein may be reduced to such a negligible value that such sands may be used without objection in the manufacture of certain types of commercial glassware.

Acid leaching of silica sands to reduce the naturally occurring iron content thereof is now commercially practiced by first heating the sand to a temperature of the order of 200° F. to 400° F. and surface coating the sand with concentrated sulphuric acid. In certain variations of the process, concentrated acid of commercial strength is applied directly to the sands, while in another variation, a dilute acid is applied to heated sands so that the water content of the dilute acid may be evaporated, leaving a film of concentrated acid on the sand. These methods result in removal of iron compounds from the sand to a degree perfectly satisfactory for certain commercial requirements but often the refinement obtained thereby is not sufficiently complete to meet some of the more rigid requirements of the glass trade as to the iron content of the sands.

It has been found that the conversion of insoluble iron compounds carried by the sand into water-soluble salts capable of being removed by leaching with water, is not complete when a concentrated acid film alone is employed. It has been determined that a concentrated film subsequently converted into a dilute acid film completes this conversion without additional acid consumption; in fact, there is a considerable possible reduction in the quantity of acid required to accomplish a given degree of refinement. Data obtained from commercial use of these various processes show that a sand treated with the concentrated acid film, in which the acid treated sand is allowed to stand in the acidulated state for one hundred hours before leaching with water, will often carry 0.031% iron, represented as ferric oxid ($Fe_2O_3$), after the treatment is completed, whereas the same sand treated with the same quantity of acid, but with the concentrated film diluted with water to form a more highly active solution film, will carry only 0.020% iron represented as ferric oxide, even though its time of standing in acidulated state is only three hours. A comparison on another sand gives 0.010% iron with the concentrated-dilute acid film practice as against 0.015% iron with the concentrated film only.

In view of the fact that there is no known practical and economical method of creating a dilute acid film at the required high temperatures and maintaining this film in a stable condition, (that is, without evaporation of water which would reconcentrate the film) advantage has been taken of the well known desiccating property of concentrated sulphuric acid, whereby the sand, heated and coated with concentrated acid, is introduced into a closed container and live steam is forced through the mass of sand in such manner as to displace substantially all the air in the interstices between the sand grains. By the procedure employed in carrying out the present invention, the entire atmosphere within the sand mass is steam or water vapor which does not appreciably condense at the temperatures used, while the vapor pressure is sufficiently high to prevent evaporation of the water taken up from the steam by the acid film on the sand particles. The acid film is thus diluted by its own affinity for moisture, the moisture being applied by water vapor and not by liquid water. The exact degree of dilution varies from 10% acid to 70% acid depending on various conditions as to temperature and time. The desired dilution of the film is entirely automatic after the air within the sand mass has been displaced by steam.

Apparatus for carrying out the present invention has been illustrated diagrammatically in the accompanying drawing, wherein:

Fig. 1 is a side elevational view disclosing a rotary mixer and a leaching tank, which form the principal parts of the mechanical equipment of the process;

Fig. 2 is a top plan view of the leaching tank;

Fig. 3 is a vertical sectional view thereof.

The first step in my present invention consists in producing a body of heated sand coated with a film of a concentrated mineral acid. This, of course, may be accomplished in many ways, but a practical way of effecting the same is to use a rotary mixer or drier of the type indicated at 5 in Fig. 1 of the drawing. This mixer or drier comprises the usual drum 6, slightly inclined with respect to the horizontal, and having its ends rotatably supported in stationary upper and lower heads 7 and 8 respectively. Sand to be treated is fed by means of a conveyor 9 into the hopper 10, the discharge chute 11 of which leads into the open upper end of the drum 6. Also leading into the upper end of the drum is an acid supply line 12, the latter leading from a tank 13 in which is received commercial sulphuric acid of 60° or 66° Bé. The line 12 may be suitably valved as at 14 for acid flow regulating purposes, and a spray nozzle 15 is carried by the outer end of the line 12 in order to distribute acid over the sand introduced into the upper end of drum 6 from the hopper chute 11.

The interior of the drum may be heated to desired temperatures (200 to 400° F.) by means of one or more fuel burners 16 carried in connection with the lower head 8, so that the heated products of combustion pass through the drum in counter-current flow to that of the sand therethrough. The upper head 7 is equipped with a vapor or gas outlet 17 in which is arranged a suction fan 18, the latter positively serving to remove gases or vapors from the drum 5.

By the use of this apparatus, a film of concentrated acid is applied to the heated sand particles passed through the drum 6. This partially treated sand is then discharged from the lower head 8 of the mixer by way of the outlet 19 and is delivered to any one of a plurality of leaching tanks 20 by the diverging conduits 21 or their equivalents. Each of these tanks is preferably formed from wood, cypress being generally used, and in practice these tanks are of such size as to receive batches of approximately one hundred tons of sand. These tanks may be alternately filled with the heated acidulated sand discharged from the mixer 5. Following the filling of the tank with the sand, live steam at boiler pressure is forced into the sand mass in an upward direction from the perforated coils 22 and 23 arranged in or on the bottom of the tank, steam being supplied to the coils by means of vertical headers 24, which lead to a source of steam supply, not shown. Air in the sand mass is displaced by the steam and exhausted from the tank by means of a fan 25 arranged in a gas or vapor outlet 26, which leads from the top 27 of each tank. Steam is introduced for some time into the tank from the coils 22 and 23 after its presence is manifest in the exhaust or outlet 26, in order to insure the absence of all air from the sand body. The sand is allowed to stand for a short time in order to allow the chemical action of the now diluted film to convert all possible iron to sulphate.

The steam is then turned off and water under pressure is introduced into the tank through the coils 22 and 23, the water passing upwardly through the sand mass dissolving the iron sulphates and excess acid and discharging the same through an overflow pipe 28 positioned in the side of each tank near the top thereof. When this discharge is neutral, as shown by the methyl orange indicator test, the water is shut off and the refined sand is removed from the tank through a valved outlet 29 in the bottom thereof, the treated sand being then dewatered, dried and screened, customary operations preparatory for shipment and commercial usages. The metal parts within the tank should preferably be of a non-corrosive material such as lead.

By the present invention, a very effective conversion of insoluble iron compounds carried by sand into water soluble iron-salts is carried out. The dilute acid is highly active in effecting this conversion and by the present invention, the difficulties hitherto encountered in prolonged acid treatment of sand with acid have been obviated. The process may be carried out in a prompt and expeditious manner with the use of comparatively inexpensive apparatus. Approximately 15 to 25 pounds of concentrated sulphuric acid are added to each ton of sand undergoing treatment. By the use of a mixer, the acid will cover all of the particles of the material with a film after the mixing operation has been completed. The sand need not be heated to a temperature materially in excess of 220° F. and satisfactory results have been obtained with sands heated to temperatures of the order of 200° F., the lower temperatures being particularly used where fuel costs must be kept at a minimum.

What is claimed is:

1. The method of removing undesired ferrous compounds from silica sands, clays, other ceramic materials, and ores, which comprises the steps of applying concentrated sulphuric acid to the sand, agitating and heating the sand to form a film of acid on the grains, placing the sand in a container, exhausting air from the container, introducing steam into the lower portion of said container for circulation through the body of sand, the steam combining with the acid film to produce a dilute acid solution around the sand grains, and removing the acid solution and impurities dissolved thereby by passing water through the sand.

2. The method of removing undesired ferrous compounds from silica sands, clays, other ceramic materials, and ores, which comprises the steps of spraying the sand with a concentrated sulphuric acid, agitating and heating the sprayed sand to form an acid film on each grain thereof, circulating steam or water vapor through a confined body of the acid coated sand for a predetermined time period, said steam combining with the acid on the sand and producing a dilute acid solution around the sand grains, and removing the acid solution and impurities contained therein by passing water through the body of sand.

JOSHUA A. CREW.